US006240362B1

(12) United States Patent
Gaspard, II (10) Patent No.: US 6,240,362 B1
(45) Date of Patent: May 29, 2001

(54) METHOD TO SCHEDULE A VEHICLE IN REAL-TIME TO TRANSPORT FREIGHT AND PASSENGERS

(75) Inventor: James G. Gaspard, II, Golden, CO (US)

(73) Assignee: IAP Intermodal, LLC, Lamar, CO (US)

( * ) Notice: Subject to any disclaimer, the term of this patent is extended or adjusted under 35 U.S.C. 154(b) by 0 days.

(21) Appl. No.: 09/690,820

(22) Filed: Oct. 19, 2000

Related U.S. Application Data
(60) Provisional application No. 60/217,247, filed on Jul. 10, 2000.

(51) Int. Cl.$^7$ ............................. G01C 21/26; G01C 21/34
(52) U.S. Cl. ........................ 701/209; 701/210; 701/26; 340/991; 340/994
(58) Field of Search ........................ 701/117, 118, 701/23, 213, 204, 208, 210, 211, 24, 25, 26; 340/990, 995, 988, 991, 992, 993, 994; 705/5, 6, 7, 8, 9, 13, 21; 342/357.06, 357.07, 357.09

(56) References Cited
U.S. PATENT DOCUMENTS

| | | | |
|---|---|---|---|
| 4,092,718 | 5/1978 | Wendt | 701/117 |
| 5,168,451 | 12/1992 | Bolger | 701/117 |
| 5,265,006 | 11/1993 | Asthana et al. | 705/8 |
| 5,444,444 | 8/1995 | Ross | 340/994 |
| 5,483,234 | 1/1996 | Carreel et al. | 340/994 |
| 5,493,295 | 2/1996 | Lewiner et al. | 340/994 |
| 5,623,413 | 4/1997 | Matheson et al. | 701/117 |
| 5,666,493 | 9/1997 | Wojcik et al. | 705/26 |
| 5,712,789 | 1/1998 | Radican | 700/226 |
| 5,736,940 | 4/1998 | Burgener | 340/994 |
| 5,739,774 | 4/1998 | Olandesi | 340/994 |
| 5,742,914 | 4/1998 | Hagenbuch | 701/35 |
| 5,774,825 | 6/1998 | Reynolds | 701/207 |
| 5,794,172 | 8/1998 | Matheson et al. | 701/117 |
| 5,797,113 | 8/1998 | Kambe et al. | 701/117 |

(List continued on next page.)

OTHER PUBLICATIONS

Amtrak, Internet, http://www.amtrak.com, Jun. 8, 2000, 4 pages.
Con–Way, Internet, http://www.con–way.com, Jun. 8, 2000, 4 pages.
Greyhound Lines, Internet, http://www.greyhound.com, Jun. 8, 2000, 2 pages.
J.B. Hunt Transport Services, Inc., Internet, http://www.jb-hunt.com, Jun. 8, 2000, 5 pages.
Rail Canada, Internet, http://www.viarail.ca, Jun. 8, 2000, 6 pages.
Trailways, Internet, http://www.trailways.com, Jun. 8, 2000, 5 pages.

*Primary Examiner*—Tan Nguyen
(74) *Attorney, Agent, or Firm*—Dorr, Carson, Sloan & Birney, P.C.

(57) ABSTRACT

A method of scheduling a vehicle in real-time to transport freight and passengers. A host receives transportation requests (e.g., to deliver freight, transport passengers, reschedule, cancel, etc.) over a network from a freight terminal and/or a passenger terminal. A route is created at the host with destinations based on the received transportation requests. The host predicts an arrival time and a departure time for each destination along the route and generates a route schedule. As the vehicle travels to each destination, the host receives actual arrival and departure times and uses these actual times to update the route schedule. The route schedule is also updated when new destinations are added or a scheduled destination is cancelled. In another embodiment, the predicted arrival and departure times are updated based on vehicle positioning data received from a global positioning system. In each embodiment, the generated and updated route schedules are posted at the host and are accessible from any remote terminal over the network.

16 Claims, 8 Drawing Sheets

U.S. PATENT DOCUMENTS

| | | | |
|---|---|---|---|
| 5,799,263 | 8/1998 | Culbertson | 701/117 |
| 5,812,959 | 9/1998 | Froeburg et al. | 701/117 |
| 5,828,979 | 10/1998 | Polivka et al. | 701/117 |
| 5,835,716 | 11/1998 | Hunt et al. | 709/213 |
| 5,836,529 | 11/1998 | Gibbs | 246/122 R |
| 5,875,412 | 2/1999 | Sulich et al. | 701/207 |
| 5,880,958 | 3/1999 | Helms et al. | 701/117 |
| 5,884,216 | 3/1999 | Shah et al. | 701/207 |
| 5,922,040 | 7/1999 | Prabhakaran | 701/117 |
| 5,982,298 | 11/1999 | Lappenbusch et al. | 340/905 |
| 5,987,377 | 11/1999 | Westerlage et al. | 701/204 |
| 6,005,494 | 12/1999 | Schramm | 340/995 |
| 6,006,159 | 12/1999 | Schmier et al. | 701/200 |
| 6,013,007 | 1/2000 | Root et al. | 482/8 |
| 6,023,232 | 2/2000 | Eitzenberger | 340/988 |
| 6,026,345 | 2/2000 | Shah et al. | 701/117 |
| 6,029,111 | 2/2000 | Croyle | 701/207 |
| 6,070,123 | 5/2000 | Beyer et al. | 701/209 |
| 6,078,850 | 6/2000 | Kane et al. | 701/29 |
| 6,081,231 | 6/2000 | Evans et al. | 342/357.13 |
| 6,087,952 | 7/2000 | Prabhakaran | 340/693 |
| 6,088,648 | 7/2000 | Shah et al. | 701/117 |
| 6,097,316 | 8/2000 | Liaw et al. | 340/988 |

| SCHEDULE (7:30 a.m.) — 310 | | | |
|---|---|---|---|
| COMPLETE (320) | DESTINATION | ARRIVAL | DEPARTURE |
| (300a →) | Town A Post Office (335) | 8:00 a.m. (345) | 8:15 a.m. (355) |
| | Town A Warehouse | 8:30 a.m. | 9:30 a.m. |
| | Town B Hardware | 11:00 a.m. | 11:30 a.m. |
| | Town C Post Office | 1:00 a.m. | 1:15 p.m. |
| | Town D Post Office | 2:00 a.m. | 2:15 p.m. |
| | Town D Bus Depot | 2:30 a.m. | 2:45 p.m. |
| | ⋮ | | |

Fig. 3b

SCHEDULE (8:30 a.m.) — 310, 300b, 350, 330, 340

| COMPLETE (320) | DESTINATION | ARRIVAL | DEPARTURE |
|---|---|---|---|
| X (325) | Town A Post Office (335) | 8:00 a.m. | 8:25 a.m. |
| | Town A Warehouse | 8:40 a.m. | 9:40 a.m. |
| | ⋮ | 345 | 355 |

Fig. 3c

SCHEDULE (9:45 a.m.) — 310, 300c, 350, 330

| COMPLETE (320) | DESTINATION | ARRIVAL | DEPARTURE |
|---|---|---|---|
| X (325) | Town A Post Office (335) | 8:00 a.m. | 8:15 a.m. |
| X | Town A Warehouse | 8:30 a.m. (345) | 9:30 a.m. (355) |
| | Town B Hardware | 11:00 a.m. | 11:30 a.m. |
| | Town C Post Office | 1:00 a.m. | 1:15 p.m. |
| | Town D Post Office | 2:00 a.m. | 2:15 p.m. |
| | Town D Bus Depot | 2:30 a.m. | 2:45 p.m. |
| | ⋮ | | |

Fig. 3d

SCHEDULE (9:55 a.m.) — 300d

| COMPLETE (320) | DESTINATION (330) | ARRIVAL (340) | DEPARTURE (350) |
|---|---|---|---|
| X | Town A Post Office (335) | 8:00 a.m. (345) | 8:25 a.m. (355) |
| X | Town A Warehouse | 8:40 a.m. | 9:40 a.m. |
|  | Town C Post Office | 11:30 a.m. | 11:45 a.m. |
|  | Town C Grocery | 12:00 a.m. | 12:15 p.m. |
|  | Town D Post Office | 1:00 a.m. | 1:15 p.m. |
|  | Town D Bus Depot | 1:30 a.m. | 1:45 p.m. |

SCHEDULE (11:00 a.m.) — 300c

| COMPLETE (320) | DESTINATION (330) | ARRIVAL (340) | DEPARTURE (350) |
|---|---|---|---|
| X (325) | Town A Post Office (335) | 8:00 a.m. | 8:15 a.m. |
| X | Town A Warehouse | 8:30 a.m. (345) | 9:30 a.m. (355) |

CURRENT POSITION: 10 mi out of Town C traveling at 60mph - Expected Arrival 15 min. (360)

| | Town C Post Office | 1:00 a.m. | 1:15 p.m. |
|---|---|---|---|
|  | Town D Post Office | 2:00 a.m. | 2:15 p.m. |
|  | Town D Bus Depot | 2:30 a.m. | 2:45 p.m. |

METHOD TO SCHEDULE A VEHICLE IN REAL-TIME TO TRANSPORT FREIGHT AND PASSENGERS

RELATED INVENTIONS

This application claims the benefit under 35 U.S.C. § 119(e) of U.S. Provisional Application Ser. No. 60/217,247 filed on Jul. 10, 2000 entitled METHOD TO SCHEDULE A VEHICLE IN REAL-TIME TO TRANSPORT FREIGHT AND PASSENGERS.

BACKGROUND OF THE INVENTION

1. Field of the Invention

This application relates to scheduling methods. More specifically, the present invention relates to scheduling, in real time, freight and passenger transportation.

2. Statement of the Problem

Many routes serviced by passenger coaches to outlying areas (e.g., farming and mountain communities) have become unprofitable as the cost of servicing the route exceeded passenger demand. As such, these routes were dropped, reducing the mobility of people living in these areas who are unable to afford private transportation (e.g., some elderly, disabled, and economically disadvantaged residents). Therefore, a need exists to schedule new routes using a vehicle that can simultaneously transport both passengers and freight, thereby ensuring the profitability of the route with fees charged for transportation of freight while servicing the transportation needs of passengers in these outlying areas.

In addition, the need to have freight delivered, especially in outlying areas, can change dramatically over short periods of time and can therefore be difficult to schedule in advance. For instance, a sudden change in the weather in a mountain community can cause a local grocery store to run short on supplies and thus require a shipment that was not needed nor predicted just a day earlier. Or a hardware store near a farming community may do heavy business one week and hardly any business the following two weeks. As such shipments are only required on an "as needed" basis. Therefore, another need exists to maintain the flexibility of the transportation schedule for both passenger and freight transportation to accommodate the needs of the various communities.

Finally, the transportation demands can change even after the vehicle is in route. For example, where the vehicle was scheduled to travel through Town A for a single delivery, and that delivery has been cancelled, there may no longer be sufficient reason for the vehicle to travel through Town A. Therefore, yet another need exists to update the transportation schedule in real-time based on changes to the transportation needs of the serviced communities.

The prior art does not address scheduling both freight and passenger transportation to meet the needs described above. Prior art passenger scheduling (i.e., airlines, trains, coaches, etc.) generally uses fixed schedules. That is, the destinations and corresponding arrival/departure times are fixed whether there is a demand for service at a given location and time or not. Passenger schedules can be "bumped" in certain situations. For instance, an airline may reschedule or reroute flights due to weather conditions at one of the airports. However, these schedules are not created in real-time based on the transportation needs of the serviced communities. Instead, these schedules are "bumped" based on external factors (i.e., the weather, engine problems, etc.). These schedules are still fixed.

Likewise, prior art freight scheduling typically does not provide fixed schedules due to the ever-changing nature of freight transportation. Instead, prior art freight scheduling generally provides a rate and a cutoff time for requests where the freight must be delivered by a deadline (e.g., a request to deliver freight to a destination by 5 p.m. on Tuesday must be received by 12 noon on the prior Monday). Other prior art freight scheduling includes load matching services for equipment owners. For example, where a truck has delivered freight from City A where the truck is based, to City B, a load matching service finds a freight that needs to be delivered from City B to City A or somewhere near City A so that the truck does not make the return trip without a load.

A number of prior art approaches exist which address a portion of the above needs. U.S. Pat. No. 5,444,444 uses a central controller and a GPS system to ascertain the location of delivery vehicles. The controller compares the actual location of the delivery vehicle to the delivery location, estimates the time of arrival to the delivery location, and notifies the recipient at the delivery location of the pending delivery time.

U.S. Pat. No. 4,092,718 sets forth a computerized dispatching system that allows a central computer to plot travel paths for a fleet of buses based upon passenger purchase of tickets. This enables the computer to schedule passengers to embark or disembark from the bus and to skip any other stops. The central computer activates indicators at each bus station to show the arrival time of the next vehicle or whether that stop will be skipped. In one example, a passenger aboard a bus can access the central computer and change a disembarkation stop to another stop. Upon receiving requests such as this, the central computer provides routing instructions and new display information at each station.

U.S. Pat. No. 5,987,377 pertains to a method and apparatus for determining the expected time of arrival of delivery truck. The delivery truck has a mobile unit which determines its vehicle position and expected time of arrival. The expected time of arrival is updated continuously throughout the trip. In the event a delivery is late, a central dispatch can inform the party awaiting the delivery of the lateness and what the new delivery time is.

U.S. Pat. No. 6,006,159 sets forth a public transit vehicle arrival information system. The transit vehicles have GPS devices which communicate with a central computer. A passenger can use a portable access means such as a pager, notebook, a palm computer to ascertain the estimated arrival time. This approach is also capable of determining the number of occupied and unoccupied seats in a vehicle. The system operates in real time and continually updates predicted arrival time and passenger loads. A passenger may carry a portable display module to receive current information as to arrival time or can receive the information over a personal computer, a home, a laptop, etc.

None of the above references teach the real time scheduling of both passengers and freight from a single vehicle. Hence, a need exists that provides a scheduling method that utilizes a vehicle that is capable of hauling both freight and transporting passengers that provides a real time scheduling process for both passengers and freight. An example of such a vehicle is found in co-pending patent application Ser. No. 09/634,326, filed Aug. 7, 2000, entitled PASSENGER AND FREIGHT CARRYING VEHICLE owned by the common assignee of the present invention.

SUMMARY OF INVENTION

1. Solution to the Problem

The present invention is a method to schedule a vehicle in real-time to simultaneously transport freight and passengers. By scheduling the vehicle to transport both passengers and freight, the profitability of existing routes increases and new routes can be added (i.e., the transportation of freight provides a guaranteed source of income regardless of the number of passengers, if any). In addition, under one embodiment of the present invention, a passenger route is reactively scheduled as a result of freight becoming available on the same route. Under another embodiment, passengers or groups of passengers can also submit transportation requests. Thus, schedules can be created on an "as needed" basis. For example, a vehicle can be scheduled to travel among Towns A, B, and C one day, and Towns A and D the next, based on the transportation needs of the various communities. The schedule is not fixed and therefore the method of the present invention accommodates the needs of the various communities. Finally, requests from shippers and passengers are received using the method of the present invention, and the schedule is continually updated in real-time to reflect any changes due to these requests, fluctuating delivery times (e.g., to allow for time requirements to load larger freight), and actual vehicle travel times. Thus, the scheduling method of the present invention allows for new unserved or underserved passenger and freight routes to be added on a real-time basis as either becomes available on the route and the schedule is constantly updated as passenger and freight requirements dictate.

2. Summary

The present invention is a method of scheduling a vehicle in real-time to transport both freight and passengers simultaneously. A host receives transportation requests from a freight terminal and/or a passenger terminal connected to the host over a network (e.g., the Internet). The transportation requests can be requests to pick up and deliver freight, to transport passengers, to reschedule a previously scheduled or cancelled request, to cancel a previously scheduled request, etc. The host then creates a route or routes having destinations based on the received transportation requests. The host predicts arrival and departure times for each destination along the route and generates a route schedule including at least the predicted arrival and departure times for each destination along the route. The generated route schedule is then transmitted to the vehicle and the vehicle embarks on the route. As the vehicle arrives and departs from each destination, the vehicle transmits actual arrival and departure times back to the host. The host uses the actual arrival and departure times to adjust the predicted arrival and departure times of the remaining destinations. The host updates the route schedule with the received actual arrival and departure times and the adjusted predicted times.

The host can also update the route schedule to include new destinations that are added after the vehicle begins traveling the route and to remove destinations when previously scheduled destinations are cancelled. In another embodiment, the host receives vehicle positioning data from a global positioning system over the network and uses the vehicle positioning data to adjust the predicted arrival and departure times. In each embodiment, the generated and updated route schedules are posted at said host (e.g., on a web page at an Internet site) so that the route schedule is accessible from any remote terminal (e.g., the passenger terminal, the freight terminal, the vehicle itself, etc.) over the network. As such, both the passenger and freight shipper can access updated vehicle schedules and plan their transportation needs accordingly.

These and other advantages, features, and objects of the present invention will be more readily understood in view of the following detailed description and the drawings.

DETAILED DESCRIPTION OF THE INVENTION

1. Overview

Figure 1:
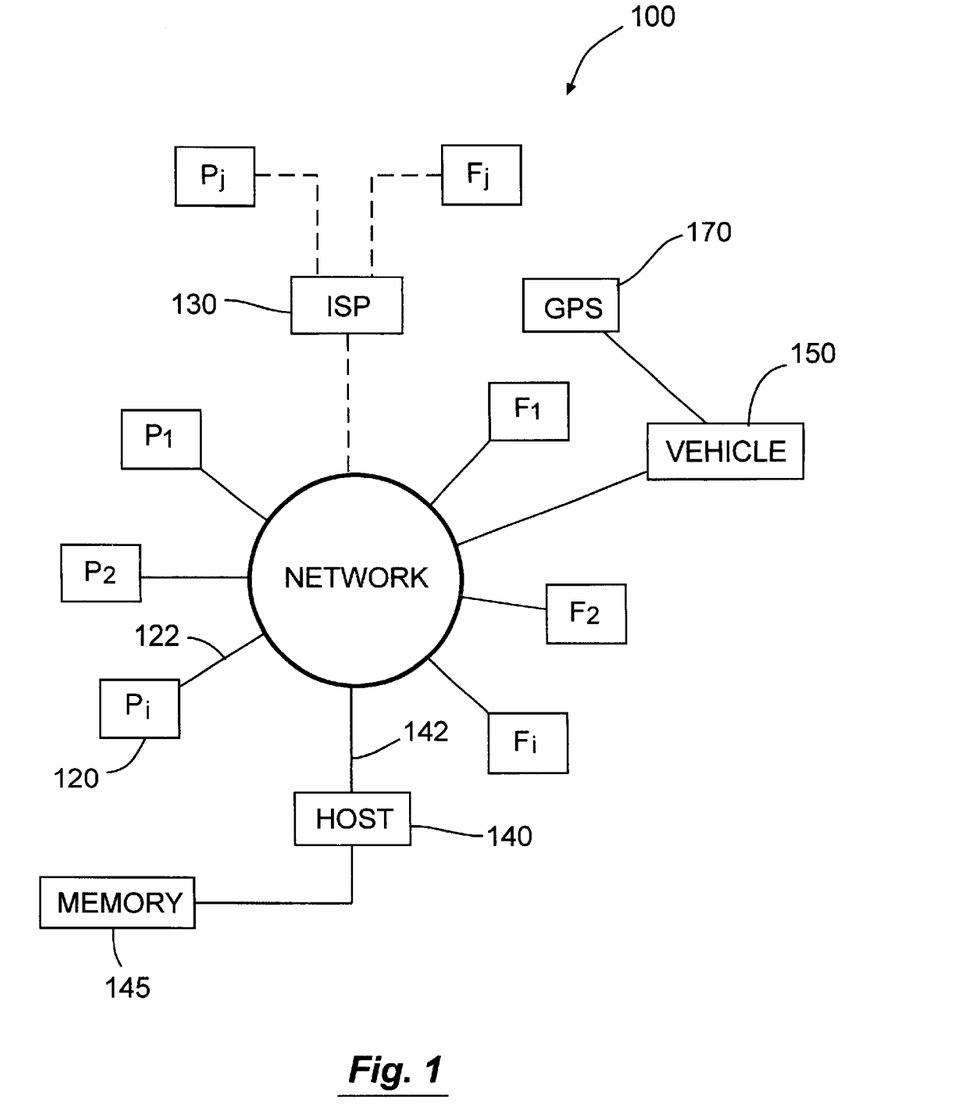
FIG. 1 is a block diagram of a communications system over which a method of the present invention is implemented.

The method of the present invention is implemented over a communications system 100 such as that shown in FIG. 1. Users access a network 110 from terminals 120 (e.g., P1, P2, . . . Pi indicating passenger terminals and F1, F2, . . . Fi indicating freight terminals). It is to be understood that while the terminals 120 are designated as passenger terminals P and freight terminals F, the terminals are preferably otherwise indistinguishable and the same terminal can be used by either a passenger or a freight shipper. Terminals 120 are interconnected (e.g., line 122 or through an Internet Service Provider 130) over the network 110 to a host 140. A similar terminal 120 can also be used on-board the vehicle 150. The host 140 is connected to the network 110 through a direct connection (or through an ISP, not shown) over line 142.

The host 140 is used to schedule a vehicle 150 to transport passengers and freight. The vehicle 150 is equipped to transport both passengers and freight (such as that disclosed in co-owned U.S. patent application Ser. No. 09/634,326, filed on Aug. 7, 2000) and is preferably scheduled, using the method of the present invention, to provide passenger service to remote areas (e.g., outlying farming or mountain communities) where such service was previously unprofitable or unavailable.

Figure 6A:
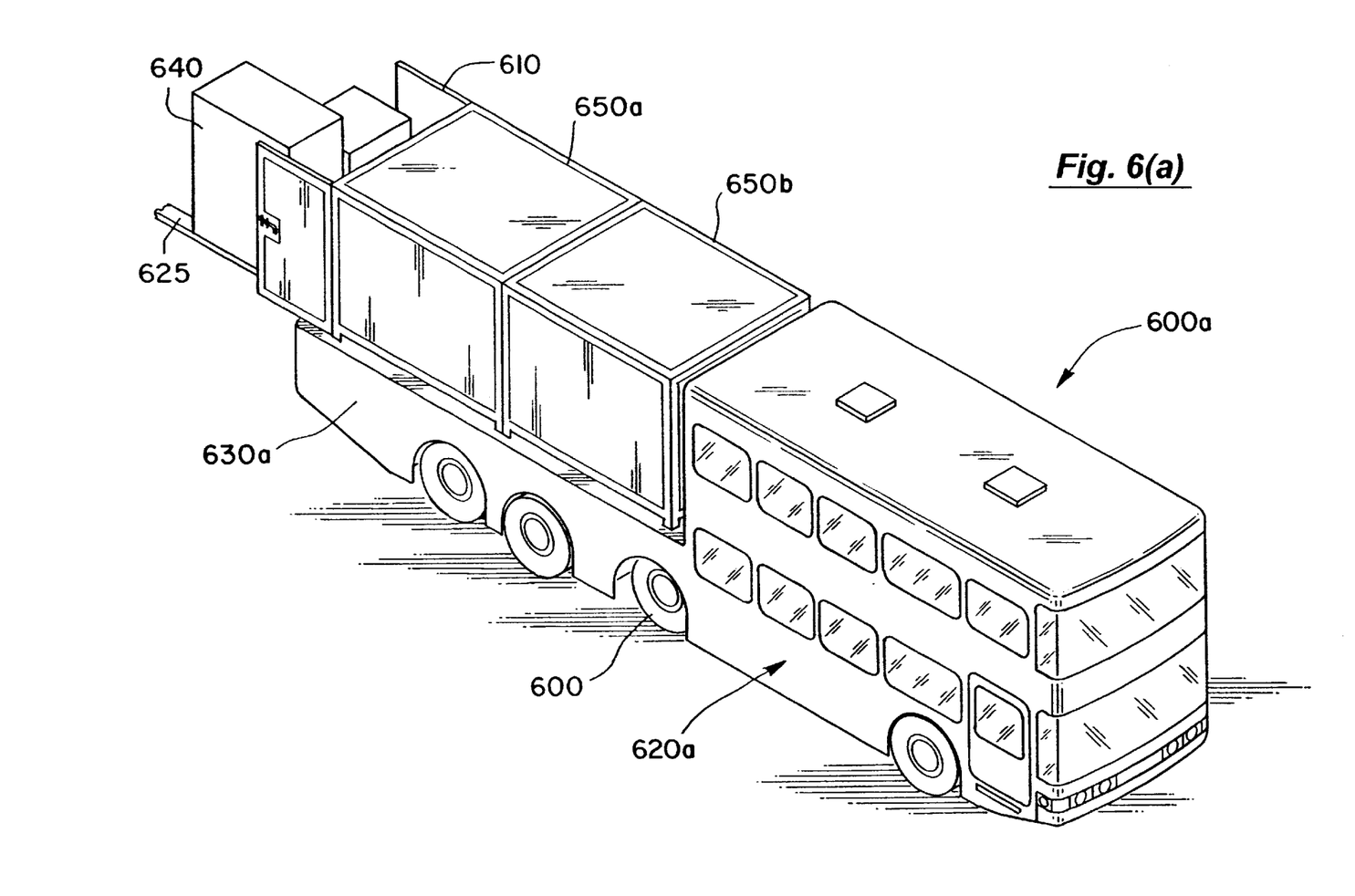
FIGS. 6(a) and 6(b) are passenger and freight vehicles from U.S. patent application Ser. No. 091634,326.
Figure 6B:
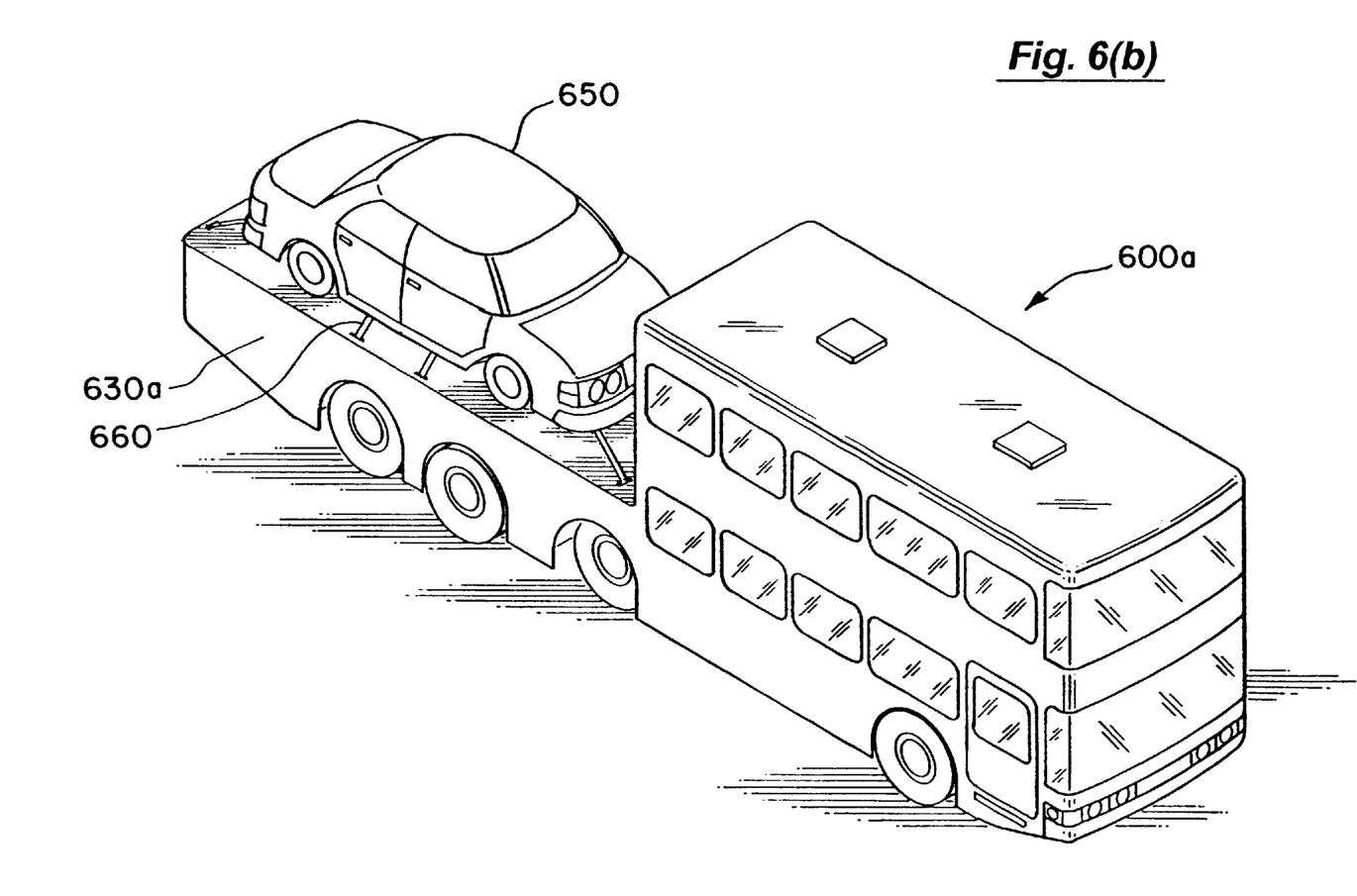

The vehicle in the aforesaid patent application is shown in FIGS. 6(a) and 6(b). The vehicle 600a has passenger area 620a and a freight area 630a. The vehicle 600a is shown carrying two, ten foot long intermodal containers 650a and 650b, removably attached to the freight area 630a. The vehicle 600a can be operated as a conventional freight carrier in the trucking industry. That is, the doors 610 of container 650*a* are opened, and some freight 640 is removed from the container 650*a* (e.g., using forklift 625), then the doors 610 are closed and the vehicle continues to the next stop with the same container 650*a*. Indeed, the freight area 630*a* can be an enclosure that is constructed as an integral part of the vehicle 600*a* and need not be removable at all. Alternatively, entire containers 650*a,b* can be delivered, removed, and the vehicle 600*a* reloaded with other containers 650*a,b*. As such, the vehicle 600*a* can participate in any number of freight markets. For example, the vehicle 600*a* can be used to deliver individual shipments to loading docks (e.g., under a post office or package delivery contract, or automobiles to dealerships), deliver individual shipments to multiple destinations (e.g., a shipment of clothes to a retail outlet and a shipment of electronics to another retail outlet or warehouse), or deliver entire containers (e.g., to freight staging areas, warehouses, shipyards, trains), etc. Alternatively, the vehicle 600*a* can operate in a combination mode where some freight 640 is unloaded at several stops and the entire container 650*a* is unloaded from the vehicle 600*a* and a full container 650*a* is loaded onto the vehicle 600*a* at the final stop. The above examples are merely illustrative of the various and different types of freight the vehicle 600*a* can carry.

It is understood that the vehicle 600*a* is not to be limited by the type of freight loaded onto freight area 630*a*. Indeed, in another embodiment shown in FIG. 6(*b*), the freight loaded on a flatbed area 630*a* (i.e., having sufficient support structure or heavy decking as described above) need not be containerized at all (e.g., automobile 650, construction equipment, lumber, conduit, etc.) and can be attached to the freight area 630*a* using any suitable conventional attachments (e.g., straps 660, chains, gates, etc.).

Although operating a vehicle for passenger service only in these remote areas would not be profitable and indeed may not even cover the operation costs, the operator of vehicle 150 is able to cover the operation costs and realize a profit by also transporting freight to these remote areas. The operator is thus able to simultaneously offer passenger service to these remote areas using the same vehicle 150 as used for freight transportation.

It is to be understood that the vehicle 150 can be any vehicle and is not limited to that disclosed by the above-referenced co-owned patent application. For example, the method of the present invention can be used to schedule airplanes, ships, boats, ferries, trains, conventional passenger coaches, etc. In addition, the method of the present invention can be used to schedule the vehicle 150 for operation in any area and is not limited to outlying areas. For example, the vehicle 150 can be scheduled using the method of the present invention to travel in an urban intra-city environment, for intercity travel, etc.

In a preferred embodiment, the communications system 100 is a conventional Intranet or the Internet and the terminals 120 and the host 140 are personal computers (e.g., conventionally available PENTIUM-based computers) or other Internet appliances (e.g., digital handheld telephones with Internet access) with access to the network 110 (e.g., via modem, network card, direct cable access, etc.). Users access a website stored at the host (e.g., in memory 145) from the terminals 120. Such access over the Internet is conventional and typically involves the use of a domain name (e.g., www.<domain name>.com). The host 140 receives information input at the terminal 120 and displays the requested website at the terminal 120. The host 140 can also be used to perform routine functions, update the website, permit administrator or operator input, etc. It is understood that the use of websites and the Internet is conventional and other arrangements are possible (e.g., where the website is stored at an ISP).

It is to be expressly understood that any suitable communications system 100 can be used under the teachings of the present invention. Furthermore, the network 110 can be land-based, satellite-based, direct cable (e.g., DSL, LAN), etc., or any combination thereof. Likewise, any type of terminal 120 (e.g., cellular phones, digital phones, facsimile machines, etc.) and any number of terminals 120 (e.g., P1, P2, . . . Pi; F1, F2, . . . Fi) can be connected over the network 110. Likewise, the individual location of the terminals 120 and the host 140 is immaterial to the teachings of the present invention. Indeed, the terminals 120 and the host 140 can be comprised of multiple components such as conventionally networked computers.

In the preferred embodiment, it is to be understood that each terminal 120 and the host computer 150 can have individual internal memory (e.g., 160). Likewise, memory 145 can be random access memory (RAM), read only memory (ROM), any suitable form of storage disk (e.g., magnetic tape, hard disk, floppy disk, ZIP disk, etc.), or any combination thereof. Furthermore, the memory 145 can be a single memory or separate memories, and can reside within the host 140 or the terminals 120 or independently thereof with separate access thereto.

In another embodiment, the vehicle 150 is also equipped with a conventionally available global positioning system (GPS) 170. The GPS provides vehicle positioning data that can be transmitted from the vehicle 150 to the host 140 over the network 110. This vehicle positioning data can be used by the host for any number of functions including predicting and updating the predicted arrival and departure times, as explained in more detail below. Likewise, the vehicle speed and other information can be transmitted from the vehicle 150 to the host 140.

2. Scheduling Method

Figure 2:
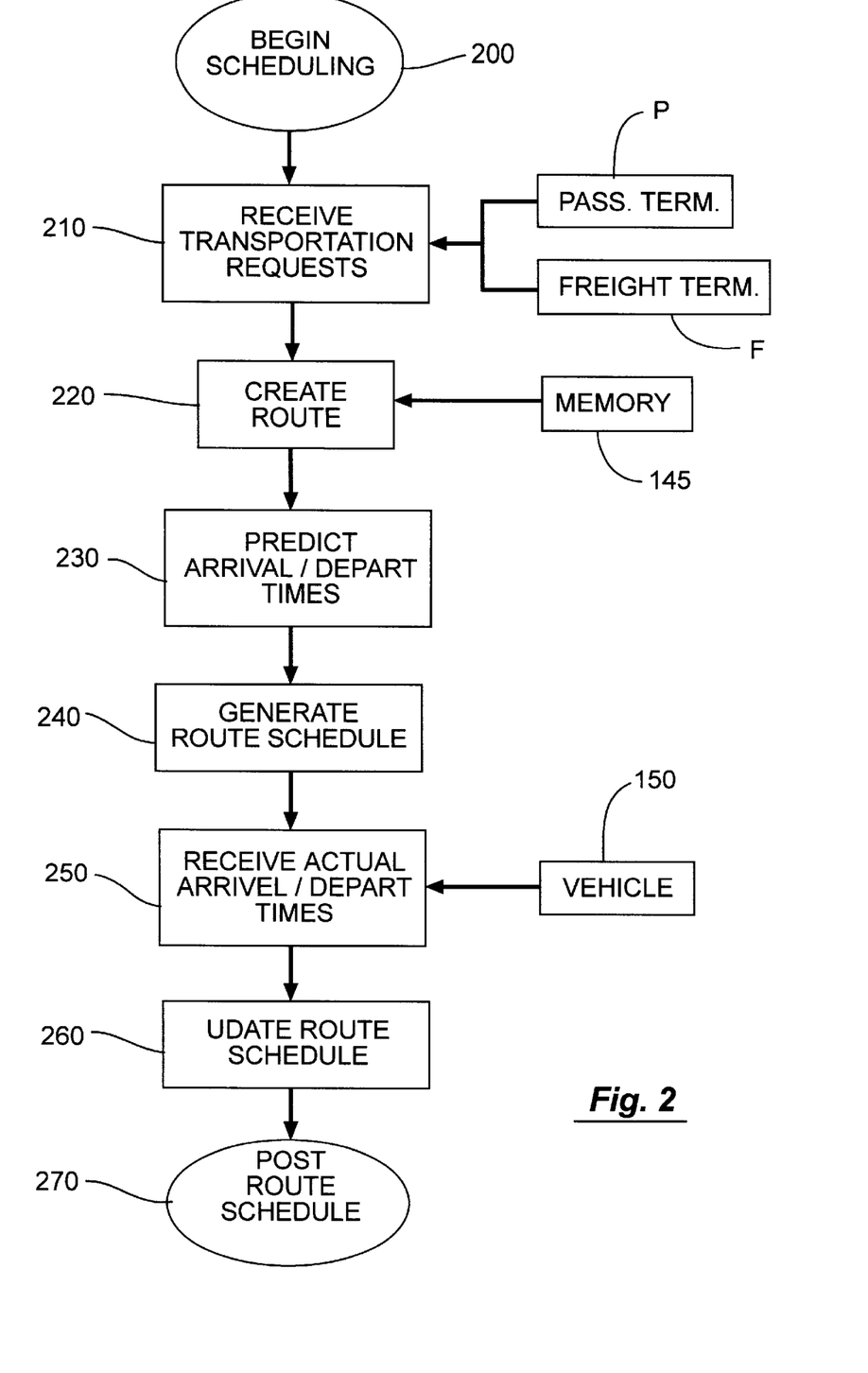
FIG. 2 is a flow chart setting forth the steps of a preferred method of the present invention.

The scheduling occurs at the host 140 and begins with step 200 in FIG. 2. The host 140 receives transportation requests from the terminals 120 (e.g., passenger terminals P and/or freight terminals F) in step 210. Transportation requests include requests by a potential passenger or a group of passengers to be picked up at one location and taken to a destination. For example, a potential passenger can access an Internet site at the host 140 from a passenger (or the number of passengers) terminal P1 over the network 110 and transmit a request to be picked up at the passenger depot in Town A and taken to the passenger depot in Town B. The transportation request can include a desired pick-up time, a desired arrival time, number of passengers, and any other information needed by the host 140 to process the transportation request (e.g., credit card information, telephone number, etc.). Transportation requests also include requests by freight shippers to pick up and deliver freight from one location to another location. For example, a freight shipper can access an Internet site at the host 140 from a freight terminal F1 over the network 110 and transmit a request to pick up a specified number of cartons having specified dimensions (i.e., volume) and weight from a warehouse in Town A and deliver it to a store in Town B. A transportation request can be a one-time request (e.g., to deliver a shipment from Town A to Town B on Day X) or a standing request (e.g., a mail contract to deliver mail between Town A and Town B daily for three months).

It is to be expressly understood that under some embodiments, transportation requests can exclude passenger requests. In such an embodiment, passenger terminals P will only be able to access the route schedule at the host 140 to determine when and where a scheduled vehicle 150 will be available to pick up passengers (i.e., the scheduled destinations of a vehicle 150). Alternatively, transportation requests for passengers can be accepted only when a group of a predetermined number of passengers (i.e., a group of at least ten passengers) make a request.

It is also to be expressly understood that the information conveyed by a transportation request will depend on design considerations. For example, the operator of vehicle 150 can require a request to transport freight to be specific, describing the size, weight and contents of a delivery. However, in some embodiments, even a request to transport freight need not be specific as to size and weight so long as it falls within set guidelines (e.g., small, lightweight packages). Likewise, in some embodiments, the operator of vehicle 150 can require prepayment at the time the transportation request is submitted, while in other embodiments, the operator can bill the freight shipper.

Once a transportation request is received at the host 140, the host 140 creates a route in step 220. That is, preferably the host 140 accesses memory 145 and retrieves a database containing available vehicles and destinations. Where a route already exists (e.g., a vehicle 150 is already scheduled to travel to or near the subject town), the host 140 will determine whether additional passengers, freight and/or destinations can be added. If a route does not already exist or an additional destination cannot be added to an existing route, the host 140 creates a new route (e.g., using conventionally available mapping software) based on past traveled routes, distance between destinations, major highways, etc. A number of routing algorithms are conventionally available to aid in the route planning. The host 140, in one variation, may receive passenger and freight requests to specific destinations over a predetermined period of time or when enough requests are made before generating a new route. For example, it may receive passenger and/or freight requests over a twenty-four hour period so as to schedule a new route. Or, when it receives enough passenger and/or freight requests that make a route profitable, the new route is mapped and scheduled. As another embodiment, with each passenger and/or freight request, the host 140 may re-examine already issued schedules to see if the current passenger and/or freight request can be fitted into an existing schedule to make an existing schedule even more profitable. In this latter embodiment, it may be that two or more schedules are modified with the new passenger/freight request to, for example, generate three profitable routes from the two and the new request. Any of a number of variations to the above are possible under the teachings of the present invention.

The host 140 then predicts arrival and departure times for each destination along the newly scheduled route in step 230. The host 140 can use any suitable algorithm to predict arrival and departure times based on, for example, mileage, past travel times, speed limits, traffic reports, etc. In step 240, the host 140 generates a route schedule including each destination along the route created in step 220 and a corresponding predicted arrival and departure time for each destination. Other information can also be included, such as directions for the driver of the vehicle 150, estimated speed, etc. Once the host 140 has generated the route schedule in step 240, the host 140 transmits the generated route schedule to the vehicle 150 and the vehicle 150 begins to travel the route.

In step 250, the host 140 receives actual arrival and departure times from the vehicle 150 as the vehicle 150 travels to destinations on the route. For example, when the vehicle 150 arrives at a warehouse in Town A, the arrival time is transmitted, either automatically or manually by the driver of vehicle 150, to the host 140. When the vehicle 150 departs the warehouse in Town A, the departure time is transmitted to the host 140. The vehicle 150 can also transmit the time at other positions along the route (i.e., with respect to the GPS 170, discussed below). When the host 140 receives the actual times from the vehicle 150, the host 140 updates the route schedule in step 260, changing the predicted arrival or departure time to reflect the actual arrival or departure time. Also in step 260, the host 140 updates the predicted arrival and departure times of the other destinations on the route based on the actual times. As such, the vehicle is scheduled in real-time. That is, the route schedule is updated to reflect changes to the transportation needs of the serviced communities and the actual travel and loading times of the vehicle 150.

It is to be expressly understood that the vehicle 150 can transmit actual times to the host 140, the host 140 can poll the vehicle 150, the transmission of actual times can be periodic, event driven (i.e., when an actual time is different from a predicted time), etc. Likewise, the schedule need not be constantly updated and can be fixed absent an interrupt (i.e., an actual time that is different from a predicted time).

In step 270, the host 140 posts the route schedule when it is generated (i.e., in step 240) and as it is updated (i.e., in step 260) so that the posted route schedule is accessible over the network from any remote terminal 120 including at least the passenger terminal P, the freight terminal F, and the vehicle 150. For example, in the preferred embodiment where the method of the present invention is implemented using an Internet site, the route schedule is posted as a web page at the Internet site and can be viewed by any remote terminal 120 that accesses that web page from the Internet site. However, it is understood that the terms "posting" or "posted" are not limited to passively leaving the schedule at a fixed place to be accessed by the terminals 120 and is also intended to include the host 140 actively transmitting the schedule to the terminals 120, for example, by facsimile, email, page, voice message, etc.

It is to be expressly understood that the steps shown in FIG. 2 are those of a preferred embodiment of the method of the present invention. However, under the teachings of the present invention, the steps shown in FIG. 2 can be performed in any order, additional steps can be added, or steps can be omitted altogether under various embodiments of the present invention.

Using the method of the present invention, vehicles 150 can be scheduled to provide freight and passenger transportation services to areas that previously had few or no mass transit alternatives. The operation of vehicles 150 in these areas can be profitable based both on the scheduling flexibility (i.e., providing services on an "as needed" basis) and from fees charged to haul freight in these areas. In addition, the ability to update the schedule to account for changes in transportation requests and the actual travel times of the vehicle 150 provide passengers and freight shippers with current schedules to better plan their own schedules.

3. Example Schedules

Figure 3A:
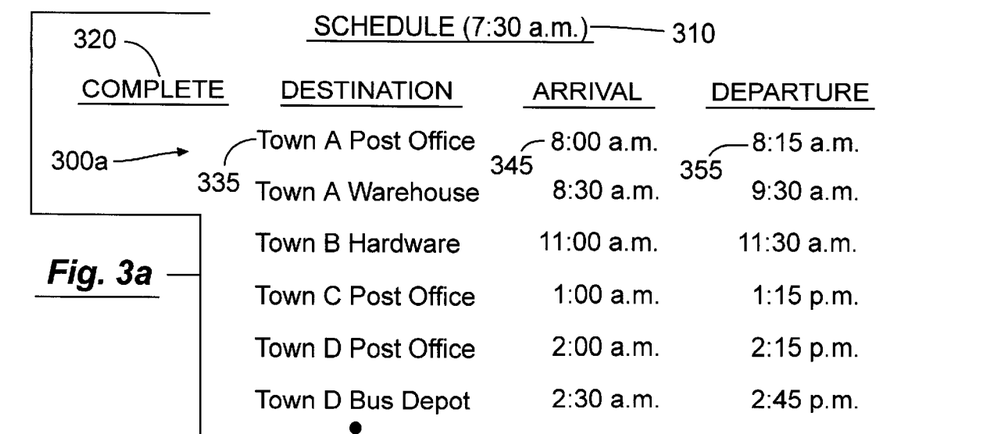
FIG. 3a is an example of a schedule generated using the method of the present invention.

FIGS. 3*a*–3*e* show examples of schedules generated by the host 140 and accessible by the terminals 120 over the network 110 using the method of the present invention. FIG. 3*a* shows a schedule 300*a* generated by the host 140 using the method of the present invention (i.e., in step 240). Schedule 300*a* contains a time field 310 displaying the time that the schedule 300*a* was last updated or changed.

Preferably, the schedule 300a is updated immediately upon any changes taking effect. Schedule 300a also contains a two-dimensional data array containing a complete column 320, a destination column 330, an arrival column 340, and a departure column 350. The destination column 330 lists each destination 335 that the vehicle 150 is scheduled to stop at (i.e., the route). The arrival and departure columns 340 and 350, respectively, list the corresponding arrival and departure times (345, 355) for each destination 335. In FIG. 3a, the vehicle 150 has not arrived at any of the destinations 335 listed in the route schedule 300a and therefore the times listed under the arrival column 340 and the departure column 350 are predicted times (i.e., determined by the host 140 in step 230). The complete column 320 indicates whether the vehicle 150 has arrived and/or departed from the corresponding destination, as explained with reference to FIG. 3b.

Figure 3B:
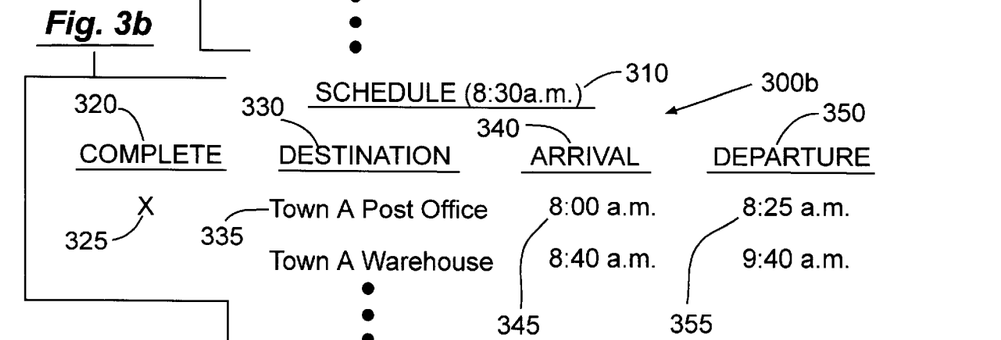
FIG. 3b shows the example schedule of FIG. 3a updated to show an actual arrival and departure time using the method of the present invention.

In FIG. 3b, the time field 310 has been updated by the host 140 (i.e., in step 260) to indicate the time that the schedule 300b was last updated (i.e., 8:30 a.m.). In addition, a marking 325 in the complete column 320 indicates that the vehicle 150 has already departed from the first destination 335 (i.e., the Town A Post Office), and that the arrival time 345 and departure time 355 shown for that destination 335 are actual times received by the host 140 from the vehicle 150 (i.e., in step 250). In the example schedule shown in FIG. 3b, the vehicle 150 arrived at the predicted time (i.e., 8:00 a.m. shown in FIG. 3a), but did not depart until 8:25 a.m. As such, the schedule 300b has been updated by the host 140 (i.e., in step 260) to reflect the new predicted arrival time 345 and predicted departure time 355 from the remaining destinations. For example, the predicted arrival and departure times for the Town A Warehouse are shown in FIG. 3b having been updated to account for the ten minute delay at the Town A Post Office.

It is to be understood that the marking 325 can be any suitable marking and need not be the "X" shown in FIG. 3b. For example, the letter "A" can appear under the complete column 320 when the vehicle 150 has arrived, thus indicating that the arrival time 345 for that destination is an actual time while the departure time is still a predicted time. Under this embodiment, the letter "D" can appear when the vehicle 150 departs, thus indicating that both the arrival time 345 and the departure time 355 are actual times for that destination. Other embodiments are also contemplated under the teachings of the present invention.

Figure 3C:
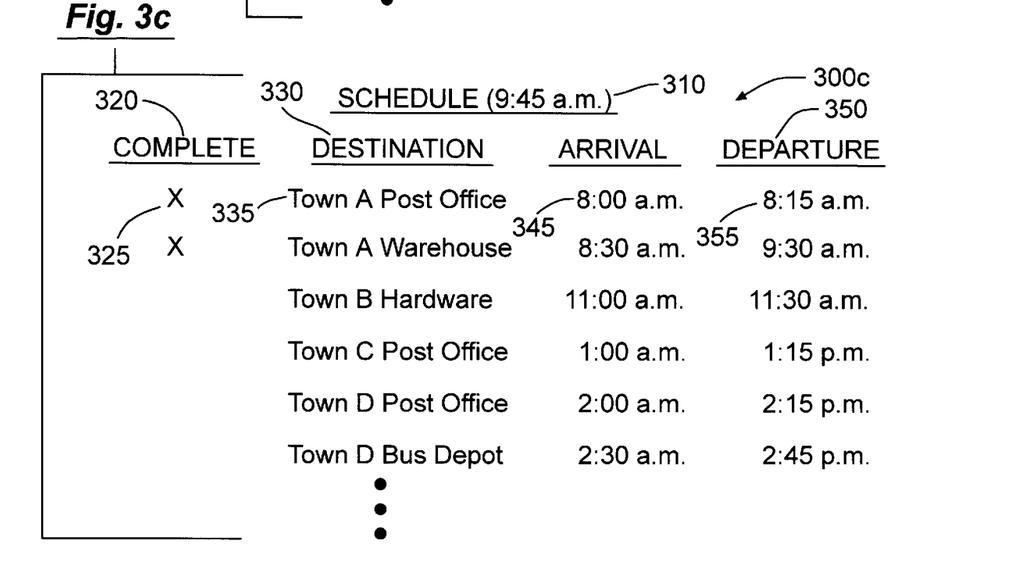
FIG. 3c shows the example schedule of FIG. 3b updated to show a cancelled destination using the method of the present invention.

In FIG. 3c, the time field 310 has been updated by the host 140 (i.e., in step 260) to indicate the time that the schedule 300c was last updated (i.e., 9:45 a.m.). Markings 325 indicate that the vehicle 150 has arrived and departed from the first two destinations and is therefore traveling to the third destination (i.e., the Town C Post Office). Again, the arrival and departure times 345, 355 shown for the first two destinations are actual times and those shown for the remaining destinations are predicted times based on the actual times and other data as described above (e.g., speed limits, travel distance, etc.). In addition, the schedule 300c shown in FIG. 3c has been updated to remove a destination (i.e., the Town B Hardware shown in FIG. 3a) from the route (e.g., due to a request to reschedule or a request to cancel a scheduled freight delivery received at the host 140 from a terminal 120 in step 210). As such, the predicted arrival and departure times 345, 355 for the remaining destinations have been updated by the host 140 (i.e., in step 260) to reflect this change to the schedule 300c.

It is to be understood that although a transportation request requesting that a delivery be cancelled is received by the host 140, the vehicle 150 can still stop to pick up passengers if desired under the teachings of the present invention. That is, having received a cancellation, the host 140 can leave the cancelled destination on the route schedule. In one such embodiment, the host 140 can leave cancelled destinations on the route schedule if the cancellation is received within one hour of the vehicle 150 reaching that destination, if there are also requests for passenger transportation at that destination, etc. Alternatively, the host 140 can cancel a destination if another nearby destination has not been cancelled. Such modifications increase the reliability of the route schedule, especially for passengers. These modifications are design considerations and fall within the scope of the method of the present invention.

Figure 3D:
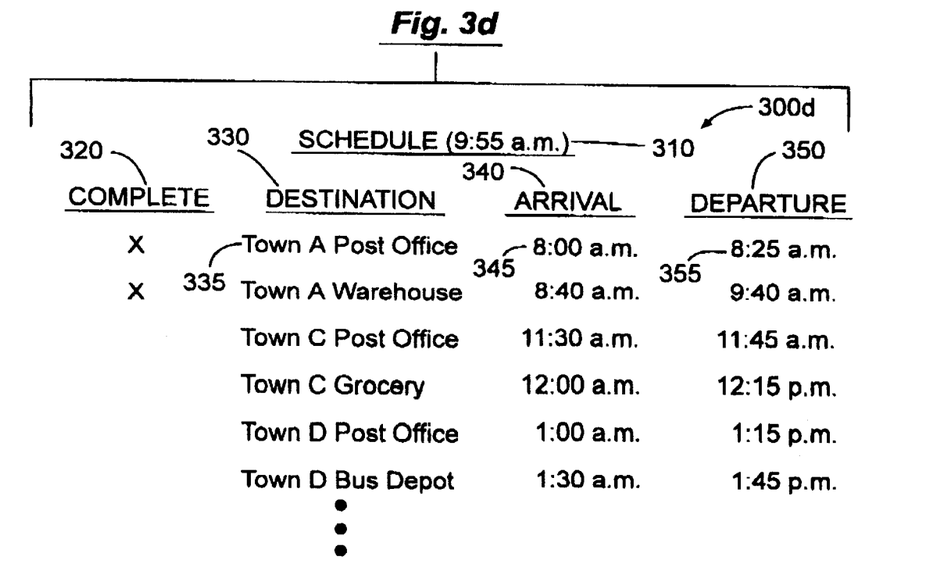
FIG. 3d shows the example schedule of FIG. 3c updated to show an added destination using the method of the present invention.

In FIG. 3d, the time field 310 has been updated by the host 140 (i.e., in step 260) to reflect the time that the schedule 300d was last updated (i.e., 9:55 a.m.). In addition, another destination (i.e., the Town C Grocery) has been added to the schedule 300d (i.e., in step 210) and the predicted arrival and departure times 345, 355 for the remaining destinations have been updated by the host 140 (i.e., in step 260) to reflect this change to the schedule 300d.

Figure 3E:
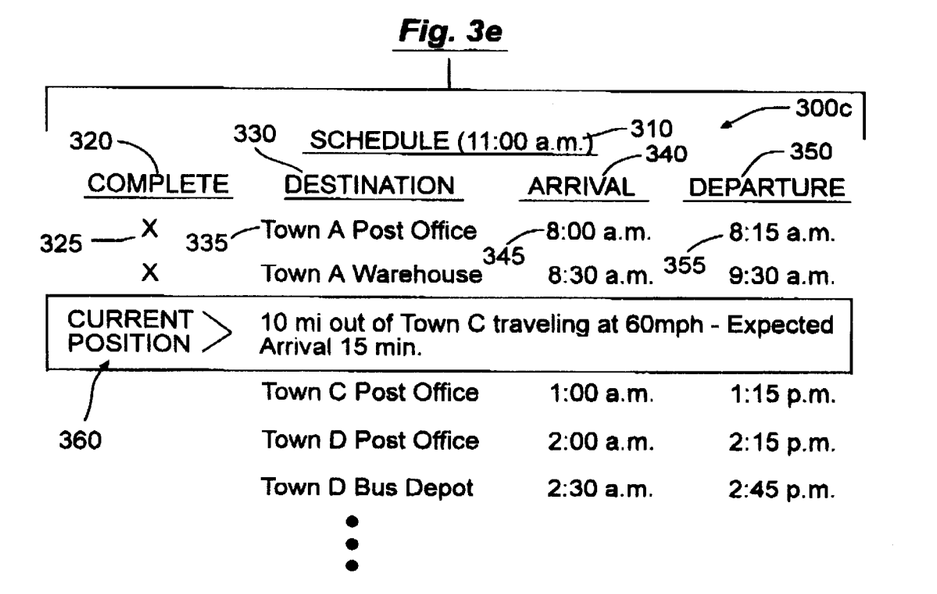
FIG. 3e shows the example schedule of FIG. 3c updated to show predicted arrival and departure times based on a global positioning system and using the method of the present invention.

In FIG. 3e, the time field 310 has been updated by the host 140 (i.e., in step 260) to reflect the time that the schedule 300d was last updated (i.e., 11:00 a.m.). In addition, FIG. 3e illustrates an alternative embodiment in which the vehicle 150 is equipped with a global positioning system 170. As such, vehicle positioning data (i.e., the vehicle location, speed, etc.) determined by the global positioning system 170 and/or other electronic equipment (i.e., speedometer, etc.) on the vehicle 150 is transmitted over the network 110 to the host 140. The vehicle positioning data can be used by the host 140 (i.e., using a suitable algorithm) to update and post nearly instantaneous scheduling data 360 in step 270 (e.g., distance, time, etc. before vehicle 150 reaches a destination 335). The vehicle positioning data can also be used to update the predicted arrival and departure times 345, 355 of the remaining destinations, as shown in FIG. 3e.

It is to be expressly understood that the schedules shown in FIGS. 3a–e are examples and are intended only to illustrate the method of the present invention. Other schedules are contemplated under the teachings of the present invention, and can contain more or less information than that shown in FIGS. 3a–e. For example, various color schemes can be employed to indicate additional information. That is, predicted times can appear in red while actual times appear in black. In another embodiment, the actual times can be posted next to the predicted times so that the predicted times can be compared to the actual times for reliability of the predicted times. In yet another embodiment, the current time is displayed in addition to the time the schedule was last updated. Likewise, the time field can also contain the date, a countdown to the next arrival and/or departure of vehicle 150, etc.

4. Scheduling Routes

Figure 4:
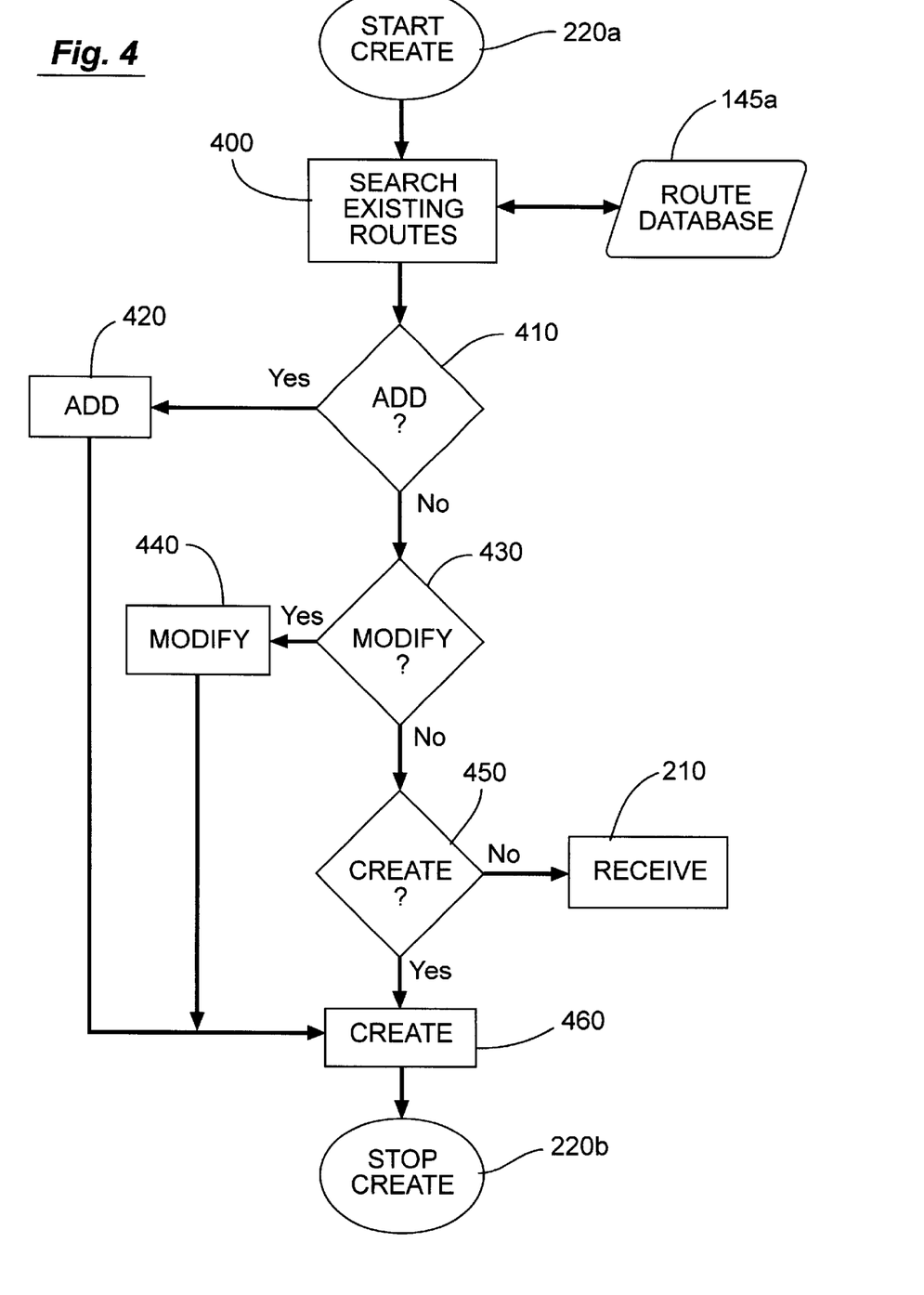
FIG. 4 is a flow chart setting forth the process step for creating a route.

In FIG. 4, the process step 220 in FIG. 2 is set forth in greater detail. The process step, in FIG. 4, enters at 220a and stops at 220b. Stage 220 is entered after stage 210 receives transportation requests. These transportation requests can be passenger or freight requests.

In step 400 the host 140 searches the existing route pertinent to the received transportation request. This search is performed in memory 145 (FIG. 1) and more specifically in a route database 145a. Once all available existing routes pertinent to the received transportation request are retrieved, stage 410 is entered to ascertain what whether or not the existing transportation request (these requests can be one or several) can be added to existing routes. If they can be added to existing routes, then stage 420 is entered and these additional transportation requests are added to the existing routes. As will be explained later, with respect to FIG. 5, this determination in stage 410 is one whether or not a passenger seat will be available for a passenger transportation request from the requested pick up to the requested destination and, likewise, freight requirements for a freight transportation request from a requested pick up to a requested destination. If a passenger seat or freight space is available, then in stage 420, the process of the present invention adds the new request to existing routes. If they cannot be added to existing routes because the routes are filled with respect to the transportation request, then stage 430 is entered.

Figure 5:
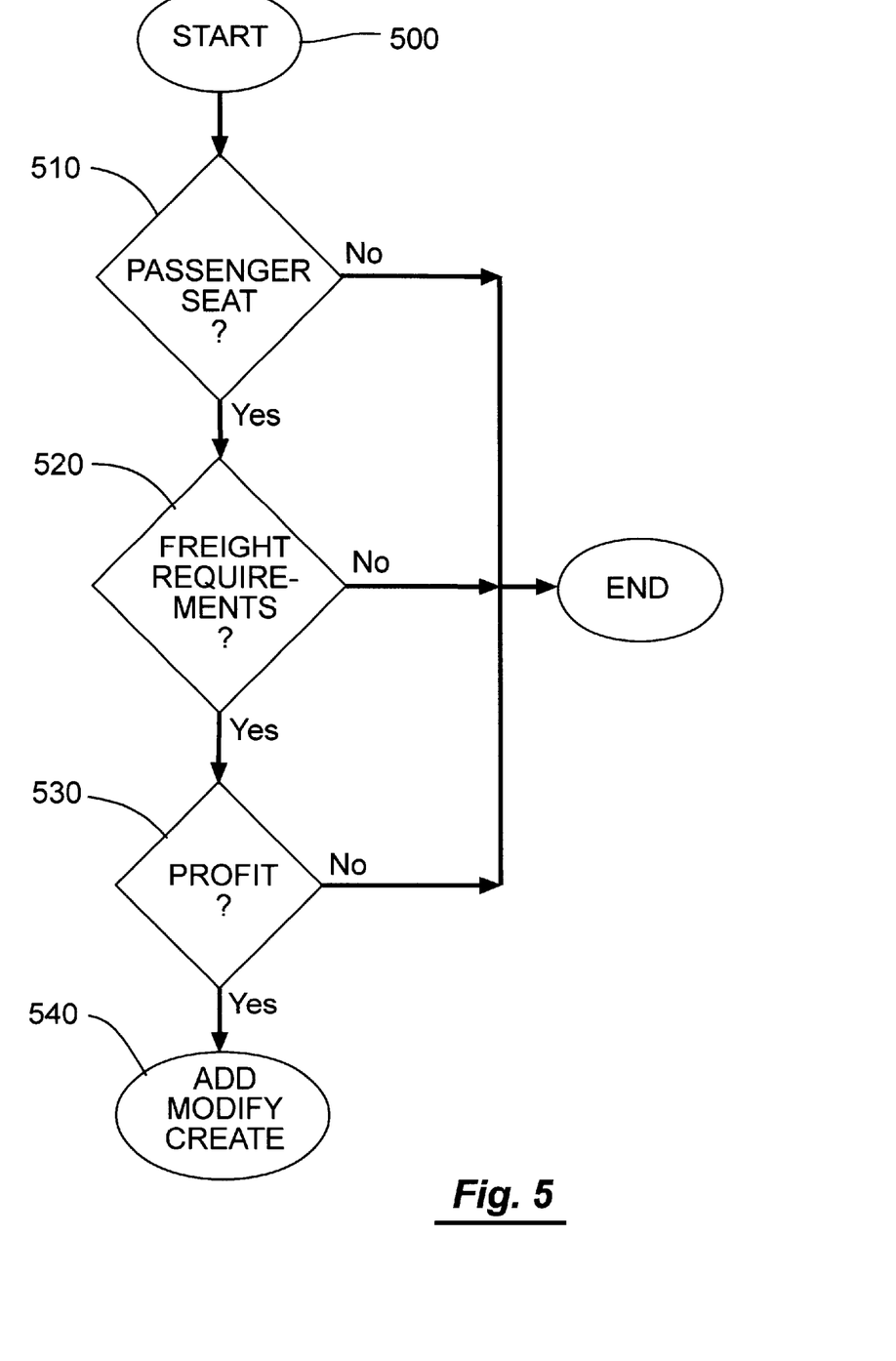
FIG. 5 is a flow chart setting the profitability determination process steps.

In stage 430, the host 140 looks at the existing route pertinent to the transportation request selected from the route database 145a and performs conventional software analysis determining whether or not the routes can be modified, partially combined together, split (e.g., two routes into three) in order to handle the new transportation request. For example, assume two existing routes are uncovered in step 400 and there are four additional transportation requests for passengers and freight. Upon conventional critical path analysis, it is discovered that modifying the two existing routes by creating three routes from the two and the four transportation requests actually results in three new routes which are at least as profitable as the prior two and, most likely, more profitable. In the modify stage 430, the passenger seat availability for the existing routes and the new route, the freight requirements for the existing routes and the new routes are all considered along with profitability as will be subsequently explained with respect to FIG. 5. If it is possible to modify, then stage 440 is entered and the modification occurs. If not, then the existing routes are left alone and in stage 450 a new route is created for the received transportation requests. If there are not enough received transportation requests, then stage 210 is re-entered and the whole process repeats until enough received transportation requests are obtained to make a new route in stage 450. In stage 450, the passenger seat availability, the freight requirements, and the profitability of the new route are all considered and, if proper, stage 460 is entered to create a new route. It is to be expressly understood that the process of FIG. 2 and FIGS. 4 and 5 is a continuous and iterative process which may be periodic, a periodic, or continuously operating in the background of the host 140. From a passenger point of view or from a freight shipment point of view, the destination of each individual transportation request remains the same whether or not the routes are dynamically changing. The goal is to maximize passenger seat usage, ship as much as possible freight, and to receive a maximum profitability figure.

In FIG. 5 and in each 410, 430, and 450, each new transportation request is evaluated as to available passenger seats in stage 510, available freight requirements (i.e., volume and weight) in stage 520, profitability in stage 530 and, if the answer is yes to all three, then adding (stage 420), modification (stage 440), or creation (stage 450) is entered. It is to be expressly understood that many variations on the method presented in FIGS. 4 and 5 can occur. For example, rather than determining profitability in stage 530, this step can be eliminated since having a predetermined number of passenger seats filled in stage 550 and/or the freight requirements fulfilled in stage 520 would indicate profitability without a separate stage. Indeed, it is the combined usage of the passenger seats 510 and the freight space 520 that could achieve a profit value. For example, two or three passengers with eighty percent of the freight space could indicate profitability or ninety percent of the passenger seats filled with twenty percent of the freight requirements utilized could indicate profitability or any suitable combined figure. With respect to using a profitability determination in stage 530, the profit value of each passenger and the profit value of each freight shipment could be determined to arrive at an overall predetermined profit figure for the vehicle traveling the route which would have to be achieved for the travel to occur and the route to be created. It is to be understood that the freight transportation requests include reservations for cubic space (whether or not the space is actually used) in the creation of a route.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

I claim:

1. A method of scheduling a vehicle for transporting freight and passengers using a host connected over a network to a plurality of freight terminals and a plurality of passenger terminals, said method comprising the steps of:

receiving over the network freight transportation requests containing pickup times, pickup locations, destination times, destination locations, and freight requirements at the host from said plurality of freight terminals;

receiving passenger transportation requests containing pickup times, pickup locations, destination times, destination locations, and the number of passengers at the host from said plurality of passenger terminals;

creating a route at the host for the vehicle having destinations based on said received transportation requests, said route created only when the vehicle can transport a predetermined number of passengers and a predetermined freight requirement;

predicting at the host an arrival time and a departure time for each destination along said route;

generating at the host a route schedule including said predicted arrival and departure times for each destination along said route;

receiving at the host actual times at said host from said vehicle as said vehicle travels to each destination along said route;

updating said generated route schedule at said host to include said received actual times.

2. The method of claim 1 further including the step of:

posting said generated and updated route schedules at said host, said posted route schedule accessible from any remote terminal including at least said passenger terminal, said freight terminal, and said vehicle over said network.

3. The method of claim 1 wherein the step of updating said route schedule further includes the steps of:

adding a destination to said generated route schedule;

adjusting said predicted arrival and departure times based on said added destination.

4. The method of claim 1 wherein the step of updating said route schedule further includes the steps of:
  canceling a destination from said generated route schedule;
  adjusting said predicted arrival and departure times based on said cancelled destination.

5. The method of claim 1 wherein said transportation requests are selected from the group consisting of requests to deliver freight, requests to transport passengers, requests to cancel passengers, and requests to cancel scheduled freight deliveries.

6. The method of claim 1 further including the step of receiving vehicle positioning data from a global positioning system over the network at said host, said generated route schedule further including said vehicle positioning data.

7. The method of claim 1 further including the step of adjusting said predicted arrival and departure times based on said vehicle positioning data.

8. A method of scheduling freight and passengers for transport using a host connected over a network to a plurality of freight terminals and a plurality of passenger terminals, said method comprising the steps of:
  receiving over the network transportation requests at the host from said plurality of freight terminals and from said plurality of passenger terminals;
  creating a route for the vehicle at the host only when a predetermined profit value based on said received transportation requests is generated;
  predicting at the host an arrival time and a departure time for each destination along said route;
  generating a route schedule at the host including said predicted arrival and departure times for each destination along said route.

9. The method of claim 8 further comprising the steps of:
  receiving actual times at said host from said vehicle as said vehicle travels to each destination along said route;
  updating said generated route schedule at said host to include said received actual times.

10. The method of claim 8 wherein said step of creating a route is based only on said received transportation requests.

11. The method of claim 8 wherein the said step of creating a route further includes the steps of:
  analyzing existing routes stored in memory at the host;
  adding one or more destinations based on said received transportation requests to said existing routes when passenger seats and freight requirements are available.

12. The method of claim 8 wherein said step of creating a route further includes the steps of:
  analyzing existing routes stored in memory at the host;
  modifying the existing routes to accommodate said received transportation requests;
  creating new routes based on said received transportation requests and said existing routes.

13. A method of scheduling freight and passengers for transport using a host connected over a network to a plurality of freight terminals and a plurality of passenger terminals, said method comprising the steps of:
  receiving over the network transportation requests at said host from said plurality of freight terminals and from said plurality of passenger terminals;
  analyzing existing routes stored in memory at the host;
  modifying at the host the existing routes to accommodate said received transportation requests;
  creating new routes at the host based on said received transportation requests and said existing routes only when at least a predetermined profit value for each new route is obtained;
  predicting an arrival time and a departure time for each destination along said route;
  generating a route schedule for each new route including said predicted arrival and departure times for each destination along said route.

14. The method of claim 13 further comprising the steps of:
  receiving actual times at said host from said vehicle as said vehicle travels to each destination along said route;
  updating said generated route schedule at said host to include said received actual times.

15. The method of claim 13 wherein said transportation requests are selected from the group consisting of requests to deliver freight, requests to transport passengers, requests to cancel passengers, and requests to cancel scheduled freight deliveries.

16. The method of claim 13 further including the step of receiving vehicle positioning data from a global positioning system over the network at the host, said generated route schedule further including said vehicle positioning data.

* * * * *

UNITED STATES PATENT AND TRADEMARK OFFICE
CERTIFICATE OF CORRECTION

PATENT NO. : 6,240,362 B1
DATED : May 29, 2001
INVENTOR(S) : Gaspard II

It is certified that error appears in the above-identified patent and that said Letters Patent is hereby corrected as shown below:

<u>Column 4,</u>
Line 34, replace "091634,326" with -- 09/634,326 --.

<u>Column 11,</u>
Line 45, replace "a periodic" with --aperiodic --.

Signed and Sealed this

Sixteenth Day of April, 2002

JAMES E. ROGAN
*Director of the United States Patent and Trademark Office*